United States Patent
Dapo

Patent Number: 5,519,567
Date of Patent: May 21, 1996

[54] LONGER LIFE ELECTROLYTIC CAPACITORS

[75] Inventor: Roland F. Dapo, Columbia, S.C.

[73] Assignee: Philips Electronics North America Corporation, New York, N.Y.

[21] Appl. No.: 132,735

[22] Filed: Oct. 6, 1993

[51] Int. Cl.$^6$ .................................................. H01G 9/02
[52] U.S. Cl. ................................................. 361/506; 361/504
[58] Field of Search ................................ 361/505, 506, 361/503–504; 252/62.2, 182.1, 506; 29/25.03

[56] References Cited

U.S. PATENT DOCUMENTS

| | | | |
|---|---|---|---|
| 3,719,602 | 3/1973 | Anderson | 252/62.2 |
| 4,652,968 | 3/1987 | Shimamoto | 252/62.2 |
| 4,774,011 | 9/1988 | Mori | 252/62.2 |
| 5,111,365 | 5/1992 | Dapo | 361/506 |

*Primary Examiner*—Bot L. Ledynh
*Attorney, Agent, or Firm*—Norman N. Spain

[57] ABSTRACT

An electrolytic capacitor having aluminum anode and cathode members separated by a paper insulating spacer impregnated with a solution of mostly a glycol or a glycol ether and minor amounts of water, pelargonic acid, isophthalic acid or terephthalic acid and an aliphatic amine sufficient to provide a pH of 7.2–7.5.

7 Claims, 1 Drawing Sheet

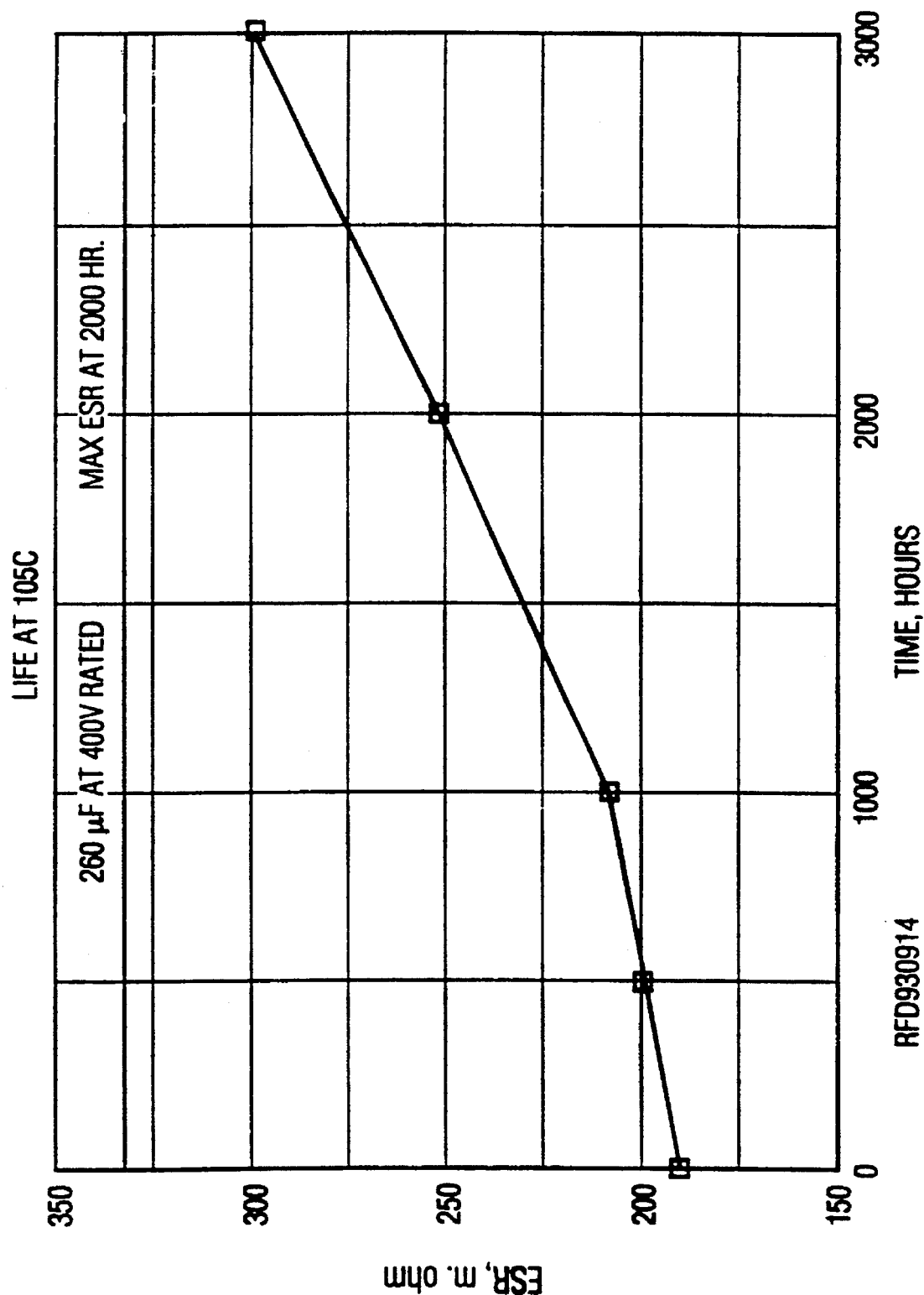

LONGER LIFE ELECTROLYTIC CAPACITORS

BACKGROUND OF THE INVENTION

It is desirable that the operating lives of electrolytic capacitors be as long as possible. The use of high voltage electrolytic capacitors particularly has increased considerably in recent years. These capacitors are used in large numbers in many devices such as power supply devices, inverters and charge-discharge devices. Increasingly, such devices require longer operating lives, low failure rates, lower ESR (equivalent series resistance) values, as well as high energy densities.

It is particularly important that during their operating lives the rate of failure of such capacitors be held to a minimum. The reason for this is that many times high voltage capacitors are used in a bank in which they are connected in parallel. Thus if one of the capacitors should short while the bank is at operating voltage the other capacitors discharge into it. As a result, the shorting capacitor is frequently totally destroyed. In such a case the device in which the capacitors are employed becomes inoperative.

The failure of such a device may have serious consequences, for example when the device is a power supply and is used in a computer. Here failure of the power supply may result in a loss of memory.

Besides the above-mentioned requirements it is an additional requirement that the electrolyte be free of toxic substances.

Capacitors provided with such an electrolyte are shown in Dapo, U.S. Pat. No. 5,111,365. The electrolyte shown in this patent contains N-methylformamide, 2-methoxyethanol, 2-ethoxyethanol, ethylene glycol or 1,2-propylene glycol, an aromatic dicarboxylic acid such as isophthalic acid or terephthalic acid and an aliphatic amine such as dimethylamine or monomethylamine. These capacitors have been found to be useful at relatively low voltage applications, for example about 55VDC.

Finkelstein, U.S. Pat. No. 4,373176 shows electrolytic capacitors for use at operating voltages of 200VDC. In these capacitors the electrolyte employed contains a tertiary amine or a dipropylamine mono salt of dodecanedioic acid dissolved in a solvent consisting of ethylene glycol, N-methyl-2 pyrollidone and water. While these capacitors are free of toxic substances, their operating lives are too short or their ESR values are too high for many applications.

SUMMARY OF THE INVENTION

It is an object of this invention to provide capacitors free of toxic substances for use at high and low operating voltages that exhibit improved operating characteristics, particularly lower ESR values and longer operating lives.

It is particularly an object of this invention to provide electrolytic capacitors that are useful at operating voltages of 200VDC and higher.

According to one aspect of the invention a new and novel capacitor comprises anode and cathode members consisting of aluminum separated by a paper insulating spacer impregnated with an electrolyte consisting essentially of a solution containing, as the major ingredient, a glycol or a glycol ether of 2–6 carbons, 0.00–10.00 wt. of an aliphatic monohydroxy alcohol of 8–12 carbons, 1.00–12.00 wt. % of water, 0.00–0.50 wt. % of phosphoric acid, 0.50–7.00 wt. % of pelargonic acid, 0.00–4.00 wt. % of an aliphatic diene monocarboxylic acid of 5–9 carbons, 0.00–5.00 wt. % of dimer acid, 0.00–10.00 wt. % of a saturated aliphatic dicarboxylic acid of 10–12 carbons, the pelargonic acid being present in an amount such that the mol % of pelargonic acid is not greater than 40 % of the total amount of acids and an aliphatic amine in an amount sufficient to provide a pH of 7.5–8.5.

Such a capacitor has been found to be particularly useful over the operating range of 200–500VDC.

According to another aspect of the invention improved capacitors are provided for use in the low-volt range of 0–100VDC.

According to this aspect of the invention the insulating spacer is impregnated with an electrolyte which consists essentially of a solution containing 1.50–4.00 wt. % of pelargonic acid 0.00–80.00 wt. % of N-methylformade, up to 0.05 wt. % of phosphoric acid, 7.00–25.00 wt. % of isophthalic acid or an equivalent amount of terephthalic acid, 1.50–15.00 wt. % of water, an aliphatic amine sufficient to provide a pH of 7.2–8.5 and ethylene glycol in an amount of about 0.00–70.00 wt. % of the solvent present, the mole % of the pelargonic acid being not greater than 5.5 mole % of all the acids present.

BRIEF DESCRIPTION OF THE DRAWING

The sole FIGURE in the drawing is a graph showing the relation of ESR to operating time for a capacitors of the invention.

DETAILED DESCRIPTION OF THE INVENTION

It should be noted that Japanese Patent Application 63-218696 shows an electrolytic capacitor employing an electrolyte containing ethylene glycol or its ethers, water adipic acid or its salts and three or more acids or salts thereof of nitrobenzoic, phthalic, salicylic, benzoic, maleic, boric, phosphoric, oxalic, malic, citric, aspartic, glutamic acid or fatty dicarboxylic acids of 4–12 carbons. There is no teaching or suggestion in this patent of employing pelargonic acid or of employing N methylformamide.

There is also no teaching in this Japanese application that the use of the electrolyte shown therein significantly extends the operating lives of the capacitors.

Further, it should be noted that Example 4 of Dapo U.S. Pat. No. 5,111,365 shows an electrolyte for a capacitor containing 59.75 wt. % of ethylene glycol, 14.00 wt. % of N-methylformamide, 4.50 wt. % of water, 0.50 wt. % of pelargonic acid, 16.00 wt. % of isophthalic acid. 0.005 wt. % of phosphoric acid and 7.25 wt. % of dimethylamine. While capacitors containing this electrolyte are useful at operating voltages of up to 75VDC, they are not useful at voltages of 100VDC as they short out when aging at this higher voltage.

However, unlike the capacitors employing this electrolyte, the capacitors of the invention for use in the 0–100VDC range and which employ electrolytes containing significantly higher concentrations of pelargonic acid, exhibit few shorts when aged for that voltage range.

A particularly useful amine that may be employed is dimethylamine. However other dialkyl or monoalkyl aliphatic amines having alkyls of 1–4 carbons may also be employed.

An example of an aliphatic diene monocarboxylic acid that may be employed is sorbic acid (2,4-hexadienoic acid), Preferable the glycol is ethylene glycol, although other examples of glycols and glycol ethers that may be used include propylene glycol and diethylene glycol.

Examples of the saturated aliphatic dicarboxylic acid that maybe employed include dodecanedicarboxylic acid and sebacic acid.

Preferably the alcohol is 1-octanol. However 1-hexanol and n-heptyl alcohol are other examples of alcohols that may be used.

Although either isophthalic acid or an equivalent amount of terephthalic acid may be employed in the capacitor designed for use in the 0–100VDC range preferably isophthalic acid is employed.

An electrolyte that is particularly useful for capacitors for operation in the 300–500VDC range contains about 87.00–88.00 wt. % of ethylene glycol, 1.00–2.00 wt. % of pelargonic acid, 0.75–2.00 wt. % of 1-octanol, 0.40–0.80 wt. % of dimer acid, 0.00–0.10 wt. % of phosphoric acid, 0.10–0.50 wt. % of hexadienoic acid, 1.00–3.00 wt. % of dodecanedicarboxylic acid, 4.00–8.00 wt. % of water and 1.10–1.40 wt. % of dimethylamine.

An electrolyte that is particularly useful for capacitors for operation in the 0–100VDC range contains 55.00–60.00 wt. % of ethylene glycol, 13.00–15.00 wt. % of N-methylformade, 4.00–6.00 wt. % of water, 0.02–0.03 wt. % of phosphoric acid, 14.00–16.00 wt. % of isophthalic acid and 7.00–7.50 wt. % of dimethylamine.

For a more complete understanding of the invention the invention will now be described in greater detail with reference to the following example, table and FIGURE of the drawing.

EXAMPLE I

The following electrolyte was prepared:

| Chemical | Wt. % |
| --- | --- |
| ethylene glycol | 87.65 |
| pelargonic acid | 1.50 |
| 1-octanol | 1.00 |
| dimer acid | 0.50 |
| 85% phosphoric acid | 0.05 |
| hexadienoic acid | 0.25 |
| dodecanedicarboxylic acid | 1.85 |
| water | 6.00 |
| dimethylamine | 1.20 |

These ingredients were mixed together and then heated to 85° C. to dissolve all the solids.

The resultant electrolyte exhibited the following properties when measured at 30° C. resistivity=620 ohm cm, pH =7.8.

This electrolyte was found to be particularly useful for employment in electrolytic capacitors designed for use in the 300–500VDC range.

The electrolyte of Example I was used to impregnate paper separators in 400VDC computer style electrolyte aluminum capacitors with 630EFV anodes.

These capacitors were placed in an over heated to 105° C. and the results after various periods of time are shown in the following table;

TABLE

EVALUATION OF EXAMPLE I OF HIGH VOLTAGE FILL ELECTROLYTE CAPACITOR TEST DATA
CAPACITOR VOLTS — 400
INITIAL VALUES (ALL LEAKAGE CURRENTS IN mA)

| U/N | IL5 min. | % CAP (uF) | % INIT | ESR (ohms) | % INIT | IMPED (ohm) |
| --- | --- | --- | --- | --- | --- | --- |
| 132 | 1.473 | 2378 | 100.00 | .0270 | 100.00 | .55838 |
| 133 | 2.059 | 2376 | 100.00 | .0260 | 100.00 | .55880 |
| 134 | 1.350 | 2398 | 100.00 | .0290 | 100.00 | .55384 |
| 135 | 1.363 | 2463 | 100.00 | .0240 | 100.00 | .53902 |
| 136 | 1.396 | 2452 | 100.00 | .0250 | 100.00 | .54147 |
| 137 | 1.630 | 2462 | 100.00 | .0240 | 100.00 | .53923 |
| 138 | 1.488 | 2400 | 100.00 | .0270 | 100.00 | .55328 |
| 139 | 1.775 | 2398 | 100.00 | .0260 | 100.00 | .55369 |
| AV — | 1.481 | 2416 | 100.00 | .0260 | 100.00 | .54971 |
| 500 HOUR VALUES | | | | | | |
| 132 | 1.936 | 2314 | 97.31 | .0260 | 96.30 | .57274 |
| 133 | 1.731 | 2315 | 97.43 | .0270 | 103.85 | .57354 |
| 134 | 1.726 | 2336 | 97.41 | .0250 | 86.21 | .56831 |
| 135 | 1.855 | 2404 | 97.60 | .0240 | 100.00 | .55222 |
| 136 | 1.637 | 2392 | 97.55 | .0250 | 100.00 | .55503 |
| 137 | 1.633 | 2405 | 97.68 | .0240 | 100.00 | .55199 |
| 138 | 1.795 | 2337 | 97.38 | .0260 | 96.30 | .56811 |
| 139 | 1.148 | 2325 | 96.96 | .0260 | 100.00 | .57104 |
| AV — | 1.729 | 2354 | 97.42 | .0254 | 97.83 | .56425 |
| 1000 HOUR VALUES | | | | | | |
| 132 | .298 | 2304 | 96.89 | .0300 | 111.11 | .57642 |
| 133 | .341 | 2305 | 97.01 | .0300 | 115.38 | .57617 |
| 134 | .199 | 2329 | 97.12 | .0300 | 103.45 | .57025 |
| 135 | .213 | 2395 | 97.24 | .0300 | 125.00 | .55458 |
| 136 | .200 | 2384 | 97.23 | .0300 | 120.00 | .55713 |
| 137 | .171 | 2397 | 97.36 | .0300 | 125.00 | .55412 |
| 138 | .203 | 2326 | 96.92 | .0300 | 111.11 | .57099 |
| 139 | .216 | 2324 | 96.91 | .0300 | 115.38 | .57148 |
| AV — | .208 | 2346 | 97.08 | .0300 | 115.80 | .56639 |
| 2000 HOUR VALUES | | | | | | |
| 132 | .148 | 2304 | 96.89 | .0360 | 133.33 | .57677 |
| 133 | .136 | 2304 | 96.97 | .0360 | 138.46 | .57677 |
| 134 | .158 | 2328 | 97.08 | .0350 | 120.69 | .57078 |
| 135 | .142 | 2393 | 97.16 | .0320 | 133.33 | .55516 |
| 136 | .134 | 2384 | 97.23 | .0340 | 136.00 | .55736 |
| 137 | .143 | 2398 | 97.40 | .0320 | 133.33 | .55400 |
| 138 | .145 | 2328 | 97.00 | .0340 | 125.93 | .57072 |
| 139 | .112 | 2326 | 97.00 | .0350 | 134.62 | .57127 |
| AV — | .142 | 2346 | 97.09 | .0343 | 131.96 | .56660 |

Notes:
1. U/N = unit member
2. IL5 = leakage current measured 5 minutes after rated voltage is reached
3. CAP = capacitance measured at room temperature, about 23° C., when measured
4. ESR = equivalent serves resistance measured at 120 Hz
6. IMPED = impedance measured at 120 Hz
7. % INIT = % of initial value An additional number of 400V rated aluminum electrolytic capacitors having an average capacitance measured at room temperature of 260 uF were prepared employing the electrolyte of Example 1. These capacitors were also placed in an oven heated to 105° C. and the ESR values were measured after various periods of time.

The results are shown in the sole FIGURE of the drawing is a graph showing the relationship of the average ESR to time in the oven of these capacitors.

What is claimed is:

1. An electrolytic capacitor particularly useful for operation in the 0–100VDC operating range, said capacitor comprising anode and cathode members consisting of aluminum separated by a paper insulating spacer impregnated with an electrolyte consisting of a solution containing, as a major ingredient, a glycol or a glycol ether of 2–6 carbons, 0.00–80.00 wt. % of N-methylformade, 1.50–15.00 wt. % of water, 1.50–4.00 wt. % of pelargonic acid, 0.00–0.05 wt. % of phosphoric acid, 7.00–25.00 wt. % of an aromatic acid selected from the group consisting of isophthalic acid and terephthalic acid, the pelargonic acid being present in an amount that is not greater than 5.5 mol% of all the acids and an aliphatic amine in an amount sufficient to provide a pH of 7.2–7.5.

2. The capacitor of claim 1 wherein ethylene glycol is present.

3. The capacitor of claim 2 wherein the aromatic acid is isophthalic acid.

4. The capacitor of claim 3 wherein the amine is a monoalkyl or dialkyl amine of 1–4 carbons.

5. The capacitor of claim 4 wherein the amine is dimethylamine.

6. The capacitor of claim 5 wherein the electrolyte contains 55–60 wt. % of ethylene glycol, 13.00–15.00 wt. % of N-methylformade, 4.00–6.00 wt. % of water, 0.00–0.03 wt. % of phosphoric acid, 14.00–16.00 wt. % of isophthalic acid and 7.00–7.50 wt. % of dimethylamine.

7. The capacitor of claim 6 wherein the amine is dimethylamine.

* * * * *